(12) United States Patent
Duberry (10) Patent No.: US 8,103,762 B2
(45) Date of Patent: Jan. 24, 2012

(54) MONITORING SYSTEM FOR MONITORING A MESSAGE-SENDING SYSTEM

(75) Inventor: Michael Charles Duberry, Somerset (GB)

(73) Assignee: Hawkgrove Limited, Chelmsford, Essex (GB)

( * ) Notice: Subject to any disclaimer, the term of this patent is extended or adjusted under 35 U.S.C. 154(b) by 799 days.

(21) Appl. No.: 12/161,619

(22) PCT Filed: Jan. 24, 2007

(86) PCT No.: PCT/GB2007/000249
§ 371 (c)(1),
(2), (4) Date: Jul. 21, 2008

(87) PCT Pub. No.: WO2007/085832
PCT Pub. Date: Aug. 2, 2007

(65) Prior Publication Data
US 2008/0288215 A1    Nov. 20, 2008

(30) Foreign Application Priority Data

Jan. 24, 2006  (GB) .................................. 0601337.9

(51) Int. Cl.
*G06F 13/00* (2006.01)
(52) U.S. Cl. ....................................................... 709/224
(58) Field of Classification Search .................. 709/224
See application file for complete search history.

(56) References Cited

U.S. PATENT DOCUMENTS
7,441,236 B2 *  10/2008  Chon et al. .................... 717/135
2003/0204370 A1  10/2003  Yemini et al.

FOREIGN PATENT DOCUMENTS

| | | |
|---|---|---|
| EP | 1 160 670 | 12/2001 |
| EP | 1 396 788 | 3/2004 |
| GB | 2 310 937 | 9/1997 |
| WO | 00/60467 | 10/2000 |
| WO | 01/86437 | 11/2001 |
| WO | 2006/047741 | 5/2006 |

OTHER PUBLICATIONS

International Search Report for PCT/GB2007/000249, mailed Jun. 15, 2007.
Written Opinion for GB 0601337.9, mailed Apr. 3, 2006.

* cited by examiner

*Primary Examiner* — Robert B Harrell
(74) *Attorney, Agent, or Firm* — Nixon & Vanderhye, P.C.

(57) ABSTRACT

In a monitoring system for a message-based, multi-component software system, such as a distributed system, interface descriptions are stored electronically for the various interfaces. Messages transmitted or received at the interfaces can be monitored and their content decoded by reference to the stored interface descriptions. Raw message data can be logged. Either monitored or logged data can be viewed by the user, either in its raw form or decoded and presented for instance in a tabular or graphical form. Different monitoring behaviors of the system can be triggered by message content. Rules can be applied so that monitoring is focused on selected message events and correlation can be done between message events at different interfaces. The monitoring system can be used with any software system for which interface descriptions are available. Messages can also be fed back into the monitored software system, optionally containing data based on detected messages, thus potentially creating monitored situations for further or better analysis.

31 Claims, 5 Drawing Sheets

MONITORING SYSTEM FOR MONITORING A MESSAGE-SENDING SYSTEM

This application is the U.S. national phase of International Application No. PCT/GB2007/000249, filed 24 Jan. 2007, which designated the U.S. and claims priority to Great Britain Application No. 0601337.9, filed 24 Jan. 2006, the entire contents of each of which are hereby incorporated by reference.

FIELD OF THE INVENTION

The present invention relates to methods and apparatus for monitoring software systems. It finds particular, but not exclusive, application in monitoring heterogeneous distributed systems.

BACKGROUND OF THE INVENTION

Software systems often involve a community of software resources which may run in different locations, in either network or geographic terms, or may be co-located, but in each case interact with one another or with some common entity. There may be no primary co-ordinating or controlling process. An example is the distributed software systems which must co-operate within a motor vehicle. There may be for example an electronic fuel injection computer, traction control, cruise control, an anti-lock braking system and a trip computer—all of which must communicate and coordinate.

There are many different types of computing systems and many challenges in successfully designing one. A common goal of a distributed computing system is to connect resources in an open and scalable way. This usually requires a fault tolerant approach compared with a system designed and built from the top down, to a single specification and architecture. For example, if a distributed system is really open to any unspecified resource, it may be made up of all sorts of different computers, with differing memory sizes, processing power and basic underlying architecture. There is always the possibility that conflicting information will be generated or the same information acted on differently by different subsystems.

However, software systems can be used in equipment which demands high reliability such as safety critical transport control or information equipment. To make this feasible, in one approach each component, or subsystem, of a software system has a predetermined interface specification or description, sometimes documented in an Interface Control Document ("ICD"), defining a set of communications protocols to which any other component must conform in order to interact with it. An interface description generally describes data by defining the syntax and semantics that a sending component will use so that a receiving component, or subsystem, will know what to do when the data arrives. In practice, two or more components may reference the same ICD where their interfaces use the same protocol(s).

Testing and monitoring can be important aspects of setting up and running any computing system. Although a subsystem interface description may appear ICD compliant on paper, in practice the subsystem may not perform as expected. For example, an ICD may not define a protocol completely or may be incorrectly implemented. There may be problems with physical properties, such as baud rate, and timing constraints, such as maximum or minimum message intervals. Different interpretations of ambiguous ICDs might lead to a lack of synchronization and things out of order. Consequently, the system as a whole may stall, partially or completely, or produce one or more incorrect results or actions.

There are many dedicated monitoring and alarm systems for running complex and/or important software. It is known, particularly in communications systems, to monitor performance in a system by building it to a protocol which means it will automatically detect aspects of that performance. For example, a protocol may have the feature that performance data is output by the subsystem in control messages which trigger a response by a receiving subsystem so that action is taken if appropriate. For instance, in mobile communications it is known to include measures in the various protocols such as a measure of current available bandwidth or the average data unit error rate, detected at either a transmission mast or a mobile handset. The data thus collected might be acted on by the network, for instance by transferring a mobile handset to a different transmission mast to achieve improved performance.

Dedicated systems such as the one described above are very effective and fully automated but will only run in a particular environment, being built into subsystems by means of behaviour of the relevant protocols. They will not transfer to other software systems without those systems being built to incorporate the protocols. Further, although the protocols cause action to be taken as necessary, everything is automated and there is often little visibility to the human operator except in prescribed circumstances. This leaves little flexibility and is wholly protocol-dependent.

It is also known to run test sequences to test the response of a subsystem to scenarios likely to occur in use, either prior to installation or for diagnostic purposes when a fault has occurred. The test sequence might be a series of commands to the subsystem that are tailored to the subsystem interface and the response of the subsystem, for instance its subsequent outputs, can be recorded and analysed to find a fault. The test sequence might be run for example prior to a system going live or when a fault has occurred. These test sequences again are designed specifically for the relevant subsystem and leave little flexibility.

Another form of monitoring arises in network-based systems and is directed to managing the network and the traffic it carries. This form of monitoring looks at traffic levels in the network and the effect on those traffic levels of individual subsystems, or groups of subsystems, in a distributed system. This is not specific to the subsystems and the subsystems do not have to conform to any diagnostic or testing protocols but problems with a subsystem can be identified if traffic levels rise or fall steeply or there is a sudden surge of traffic from a subsystem in an already congested part of the network. However, although a problematic subsystem might be identified, traffic monitoring cannot usually shed light on the cause of the problem within the subsystem.

BRIEF SUMMARY OF THE INVENTION

According to a first aspect of an embodiment of the present invention, there is provided a monitoring system for monitoring the performance of a software system in use, the software system comprising at least two subsystems having interfaces for sending and/or receiving messages, each subsystem having at least one associated interface description, the monitoring system comprising:

i) at least one message detector for detecting messages output by a subsystem interface;
ii) an interface description store for storing one or more interface descriptions; and iii) a message data decoder for decoding data from a detected message;

the monitoring system being adapted to:

iv) detect a message output by a subsystem interface; and v) decode data from the detected message by reference to a stored interface description for the subsystem interface.

Interface descriptions such as those documented in ICDs will usually describe all the data that might be output by an interface. In order to support decoding, as well as defining syntax a stored interface description will comprise, or include a reference to, vocabulary to support that decoding. A key feature of embodiments of the invention is the ability to incorporate these interface descriptions so that message data can be consistently analysed and/or related.

A database of interface descriptions can be constructed using known software engineering tools, such as an existing UML ("Unified Modelling Language") or SysML ("Systems Modelling Language") computer-aided software engineering tool, thus directly leveraging the benefits of an intellectual design process in producing compatible data definitions, but could be built in other ways, for example manually.

Embodiments of the invention can operate simply on information content passing between subsystem interfaces and do not need to take into account software processes such as function calls or methods that an interacting subsystem might use. Thus messages which might be detected by embodiments of the invention are information carrying and message data which might be decoded by an embodiment of the invention comprises the information content of such messages, such as values taken by variables.

Preferably, the monitoring system further comprises a message content store for storing content data from detected messages, either still coded or after decoding.

Data from detected messages could be just stored, or transmitted elsewhere. However, it is convenient that the monitoring system further comprises vi) a user interface for receiving user commands and for displaying decoded message data, the monitoring system being further adapted to output decoded message data to the user interface.

Preferably the user interface is provided with at least one search tool and a set of display modes or formats so that a user can enter user commands to select data for display and the way in which it is displayed.

There may be one user interface or there may be further instances of user interfaces, having the same or different functionality. For example, the monitoring system might be provided with at least one further user interface at a remote location, for receiving message data over a network. The further user interface might simply be capable of displaying a copy of data selected at the first user interface or it might be adapted to receive and respond to user commands.

The monitoring system may further comprise a system description store for storing at least one system description associated with the software system, said at least one system description comprising a reference to at least one stored interface description for a subsystem of the software system. Additionally, each system description will usually be adapted to store parameters describing each interface for which it comprises a reference to an interface description.

In a software system, there are likely to be multiple interfaces and therefore multiple stored interface descriptions. A system description can be used by the message data decoder for locating the relevant interface description for decoding a detected message.

A feature of known interface descriptions is that messages will often carry codes for data rather than the data itself. This reduces the size of the message and thus reduces communications traffic in the system. This coded data would not normally be decoded within the system, only when used for example at a user output. Embodiments of the present invention allow at least some of that coded data, and preferably all of it, to be detected and decoded with respect to any interface within a software system. This greatly increases flexibility, giving the user an opportunity to track data within the system. This is useful for example if faulty data is arising. The user can then track the faulty data to a subsystem at which the data is arising and may be able to analyse the problem.

Embodiments of the invention are powerful in that they can be used to analyse interface performance throughout a system, giving an overall picture of the system behaviour. Given sufficient message detectors, this can be done for all the interfaces, or for all interfaces that are likely to be causing a problem, in a short time frame and thus give a fault diagnosis relatively fast.

Thus preferably, embodiments of the invention further comprise at least two message detectors so that each of the two message detectors can be positioned at different points with respect to the software system. This allows messages being received and/or transmitted by a subsystem to be monitored and potentially correlated with related messages appearing elsewhere in the software system.

For analysis purposes, a monitoring system as described above preferably further comprises a trigger store for storing sets of trigger data, each set of trigger data identifying a condition to be applied to at least one data value in detected messages and an action to be taken by the monitoring system in response to detection of data meeting the condition.

For example, a condition might be set such that the monitoring system starts to log data when a specified data value passes a threshold.

In a more complex version of the triggering described above, there may further be an interface state specified and the action is only taken when both the condition and the interface state are found. This supports a powerful embodiment of the invention in that, where there are two message detectors picking up messages from different interfaces, the monitoring system can correlate messages from different interfaces. An interface state might identify both a data value to be found in a detected message and a time interval within which the data value is to be found. The monitoring system might then be triggered, by detecting a condition in relation to a first interface, to look for another data value within a time interval—which could emanate from a different interface.

Preferably, embodiments of the invention further comprise a simulated message output for outputting one or more simulated messages to a subsystem interface. This allows the monitoring system to simulate functionality of the software system in a targeted manner so that specific responses can be elicited, ie stimulated, for test purposes. Another advantage of the simulated message output arises where a heterogeneous system has been developed. It may be the case that one or more subsystems is not available. The use of simulated messages allows the presence of a missing subsystem to be artificially created such that the existing subsystems can be tested in a "live" situation. A further option is that the simulated message output is adapted to output one or more simulated messages based on, or comprising, detected message data. This means that an event involving one or more monitored subsystems can be "re-run" for fault analysis or other purposes.

Preferably embodiments of the invention further comprise a message logger for logging monitored messages against time. This supports analysis of problems that might be time-based, such as maximum or minimum message intervals not being met or being insufficiently defined in an ICD.

Thus embodiments of the invention can create a message content store or database that can be used to capture and represent in a formalised manner any combination of data items carried by what can be collectively referred to as a message (or payload) between subsystems.

Embodiments of the present invention can offer the user a view of communications between subsystems which are not themselves designed to give that view. Further, as long as a software system has appropriate interface descriptions available, an embodiment of the invention can be used with any software system, new or pre-existing, which has components within it that communicate via interfaces. This can offer a truly impartial as well as non-intrusive view of the operation of a monitored system which may assist with problems arising from either incomplete ICDs or incorrect implementation of an ICD by allowing visibility of actual message content sent in use of a software system.

The collaborative and investigative facilities available in embodiments of the invention are also uniquely rich, including as they can:
  rules based or triggered monitoring
  the potential to insert data into a system being monitored, or to replay monitored data back into the system
  replay of data for viewing and/or analysis, in real or modified time
  powerful search facilities
  the option of having live data feeds to other instances of the monitoring system, or to other user interfaces of the same monitoring system The provision of common, electronic, representative, interface definitions which can be "animated", coupled with the ability to capture and monitor the same information for any subsystems, not just those either initially installed or those initially designed to work together, is of major benefit in terms of cost, timescales and risk reduction to any project development.

Embodiments of the invention also comprise individual components of the monitoring system described above where they provide significant supporting capabilities, and in particular a message detector for use in the monitoring system. For example, a message detector for use in the monitoring system might comprise:
i) at least one input for receiving message data from a data capture device, the message data having been output by an interface of a software system;
ii) an interface parameter store for storing parameters of one or more interfaces for which message data will be received;
iii) a connection for sending received message data for decoding by the message data decoder of the monitoring system and for receiving control messages of the monitoring system; and
iv) a controller for controlling receipt of message data from the data capture device in response to said control messages.

Because the message detector is conveniently embodied as a client device in a client/server style of architecture, the main components of the monitoring system being installed as a server, the message detector is generally referred to in this specification as a "client device". However, architectures other than client/server could be used.

Preferably, the message detector further comprises an output for transmitting message data from a data capture device to an interface of the software system. This can conveniently be provided by the input for receiving message data. The ability to inject message data into the software system offers a wide range of test capabilities since conditions, and even missing components such as missing subsystems, in the system can then be simulated and a response of the system thereto can be monitored.

BRIEF DESCRIPTION OF THE DRAWINGS

A monitoring system according to an embodiment of the present invention will now be described, by way of example only, with reference to the accompanying figures in which.

DETAILED DESCRIPTION OF THE INVENTION

Embodiments of the invention can be implemented using a client server architecture. There may be a number of client devices to act as message detectors, distributed geographically at locations where subsystem interfaces are to be monitored. Each client device may be implemented as a relatively dumb data gathering device, specific to the type of subsystem interface to be monitored. Hardware suitable for connecting to the subsystem interface will be installed and the client device gathers message data via this hardware. The data can be forwarded to a server via an Ethernet connection, or the internet. Messages can also be delivered in the other direction, from a client device to a subsystem interface.

The server will log, collate and interpret (that is, decode) the data using the ICDs for each subsystem interface. The interpreted data can be presented to the user in for instance graphical or tabular form. Logged data can be replayed. Trigger conditions can be set to start logging when preset conditions are met in the monitored data to allow anomalous conditions to be captured. Rules can be set up to allow relationships between data on different subsystem interfaces to be examined. Data can be selected for feeding back to a subsystem interface so that specific events or conditions can be investigated.

The ICDs describing the subsystem interfaces can be written using any appropriate technique, an example being the use of extensible markup language ("XML"), and appropriately formatted for the monitoring system. A database for storing the ICDs, and all other data which can be generated in setting up and using the system, can be generated directly from an existing UML or SysML computer-aided software engineering tool, or can be built manually.

Figure 1:
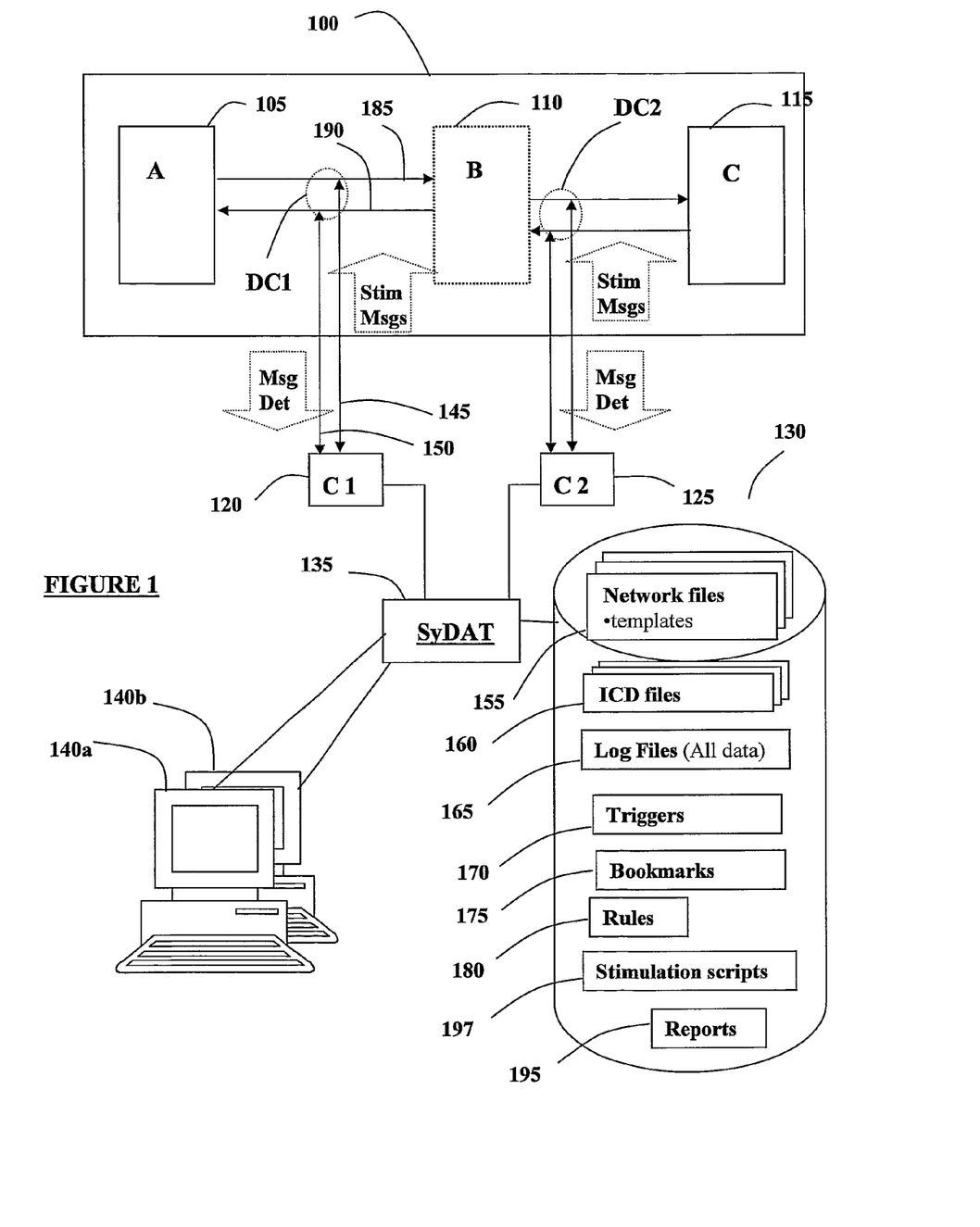
FIG. 1 shows a schematic block diagram of the monitoring system in use for monitoring a software system.

Referring to FIG. 1, a software system 100 being monitored might comprise for example a series of subsystems 105, 110, 115 making up a transport control system such as that controlling an aircraft or a railway. The monitoring system has two client devices 120, 125 as message detectors for monitoring messages carried between pairs of the subsystems 105, 110, 115. These client devices 120, 125 are connected into network links, using data capture devices DC1, DC2 to make the actual connections, either side of a subsystem 110 of the distributed system 100. Message data detected by the client devices 120, 125 via the data capture devices DC1, DC2 is delivered to a monitoring system 135 which in turn is connected to a database 130 and a user interface 140. The monitoring system 135 comprises a set of software processes for decoding detected message data, by referring to the database 130, and outputs the decoded data to the user interface 140.

The monitoring system 135 and the database 130 are not necessarily physically or geographically separate but may reside together on a server or other computing apparatus.

Each of the data capture devices DC1, DC2 is built to detect data relevant to a pre-specified interface of the subsystem 110. Data capture devices DC1, DC2 can be built wherever interface data is available for the relevant subsystem 110.

Figure 2:
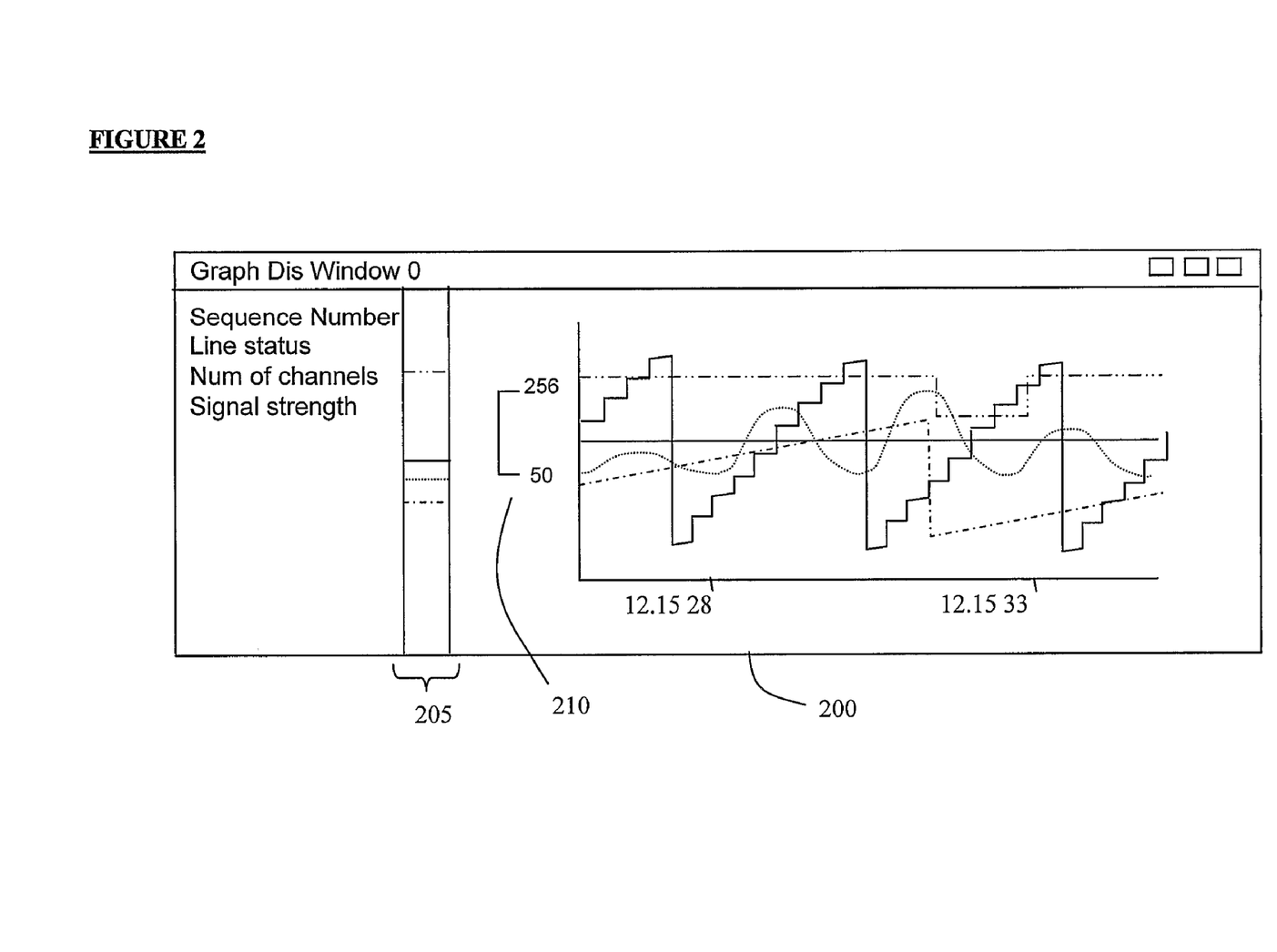
FIG. 2 shows examples of decoded message data that has been collated and output by the monitoring system to a user interface in graphical form.

Message data can be transmitted between the client devices 120, 125 and the monitoring system 135 using any suitable transmission means, such as a local link or the Internet, supporting local or wide geographical coverage by the system overall. Referring also to FIG. 2, the monitoring system 135 monitors all the data and decodes at least some of it, using a vocabulary element of ICD data files 160 for the relevant subsystem 110 stored in the database 130. The system 135 can then log the data, for example on user command or in automated response to conditions, and can collate the data to produce human readable output in a form such as a report or on-screen display 200, in various different formats including tabular or graphical (as shown).

Software processes of the monitoring system 135 allow it to be tailored by a user to a particular monitoring situation. For example, the user might set a trigger condition which, when met, triggers the monitoring system 135 to change its monitoring behaviour. Alternatively, the user may be able to set the monitoring system 135 to support correlation of message data detected at different points of the monitored software system 100. The user can also use the client devices 120, 125 to inject messages from the monitoring system 135 to a relevant subsystem 110.

2. Data Capture and Client Devices DC1, DC2, 120, 125

Figure 3:
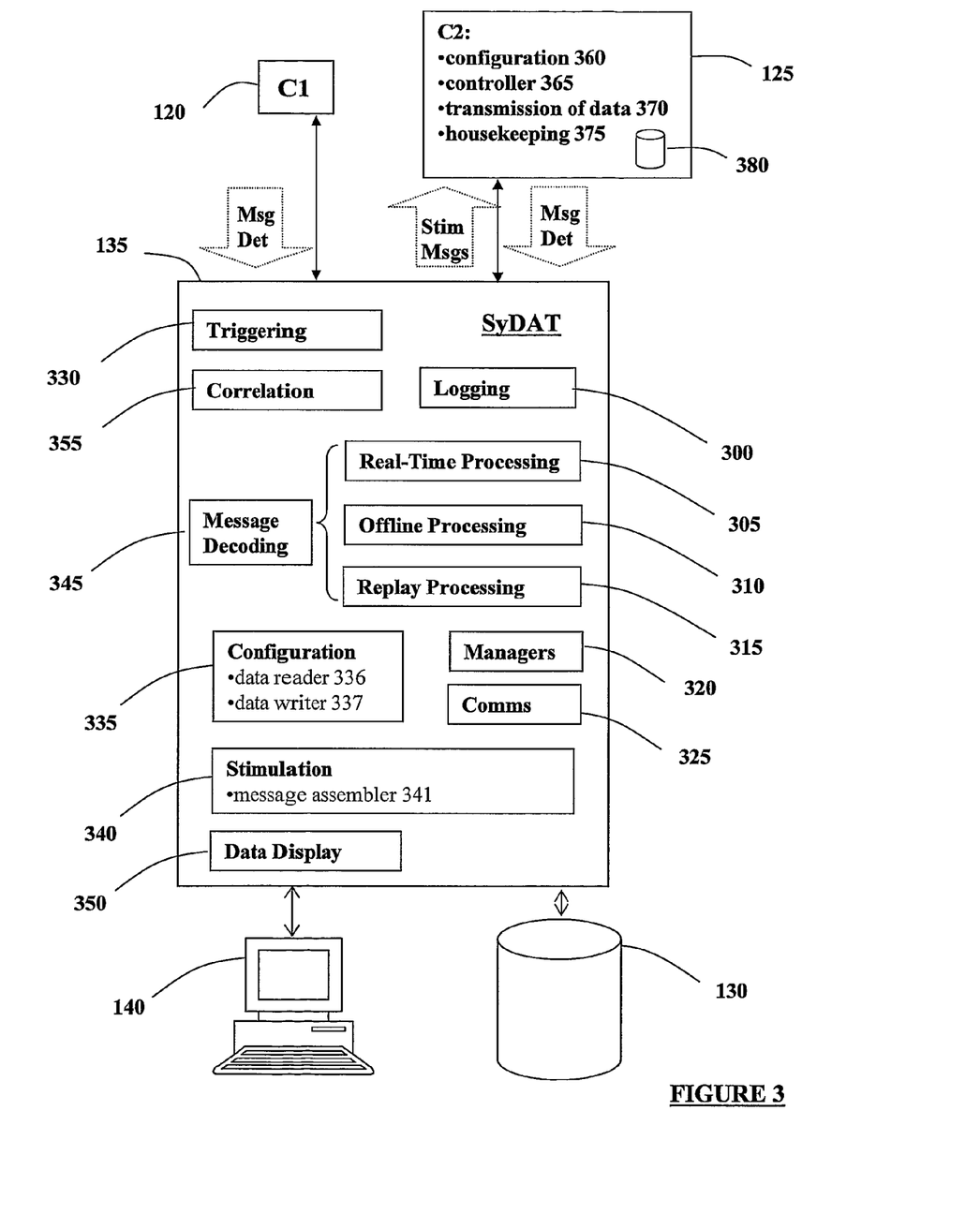
FIG. 3 shows in more detail the functions of the monitoring system of FIG. 1.

Referring to FIG. 3, the client devices 120, 125 communicate with the monitoring system 135 over a TCP/IP connection, for instance using an intranet or the internet, although other connection types might be preferred, such as known USB (Universal Serial Bus) and GPIB (General Purpose Interface Bus) connections. The structure of messages passed between the monitoring system 135 and the client device 120, 125 supports the following operations:

configuration of the client device 360
resetting, starting and stopping of a monitoring activity 365
recovery of data 370 monitored by the client device
delivery of messages 370 from the monitoring system 135 for injection to a relevant subsystem 110
housekeeping 375

Configuration 360 might for example set parameters of an interface to be monitored by the client device 120, 125 and would include synchronisation of time between the host platforms of the client device 120, 125 and the monitoring system 135. Resetting, starting and stopping of a monitoring activity 365 allows the monitoring system 135 to switch the client device 120, 125 on and off and to reset its monitoring mechanisms, such as data buffers, back to zero. Recovery of data 370 and delivery of messages 370 are together the transmission of message data between the client device 120, 125 and the monitoring system 135, either for monitoring purposes or for stimulation of a monitored interface, while housekeeping 375 includes such known functions as use of heartbeats and performance and error data.

Each client device 120, 125 may be provided with one or more data capture devices DC1, DC2. Each data capture device DC1, DC2 provides a physical connection to the monitored system 100 and at least one interface compatible with a subsystem interface from which data is to be captured or to which data is to be injected. Thus three example combinations of client device 120, 125 and respective data capture devices DC1, DC2 are as follows:

1) a serial, discrete and frequency/phase capture client device 120, 125 is embodied as an application residing on a personal computer ("PC") and connected via a controller area network bus ("CAN-bus") to a single board computer (167 processor). Data capture devices DC1, DC2 are provided by serial and discrete interfaces on the single board computer, connected to breakout cables in the distributed system 100 to be monitored. The interfaces on the single board computer can be continuously monitored, and any activity detected sent to the client device 120, 125 via the CAN-bus. The client device 120, 125 then sends the raw captured data to the monitoring system 135 where all the logging, data decoding and display are done. Up to four cards can be connected to the client application, supporting up to four different data capture devices DC1, DC2;

2) a multi-protocol serial capture client device 120, 125 is again embodied as an application residing on a PC, the data capture devices DC1, DC2 being in the form of one or more capture cards installed on the peripheral component interconnect ("PCI") backplane of the PC. The client device 120, 125 reads the data from each card using a dynamic link library ("DLL") as part of the client application. This arrangement allows the analysis of various types of serial interfaces. The client device 120, 125 again sends the raw captured data to the monitoring system 135;

3) a TCP/IP client device 120, 125 is again embodied as an application residing on a PC. In this case, the data capture devices DC1, DC2 are represented by the local area network ("LAN") card of the PC running in promiscuous mode. The client device 120, 125 gathers data from the LAN card, filtering it by internet protocol ("IP") address, and again sends the raw captured data to the monitoring system 135.

Thus each client device 120, 125 together with its data capture device or devices DC1, DC2 is tailored to one or more particular interface types and may in practice deal with any of several different types of data such as serial data, parallel data, network data and/or analogue data. The interface might also be one of many different types, such as that of a subsystem in a distributed system or of a software component within a program. Each client device 120, 125 and its data capture device(s) DC1, DC2 will often comprise a combination of software and hardware.

In general, a client device 120, 125 can be described as a message detector with at least one input for receiving message data from an interface of a software system via a data capture device DC1, DC2, and a connection for forwarding received message data to the monitoring system 135. In order to support this capture and forwarding of message data, the client device 120, 125 also has an interface parameter store 380 for storing parameters of one or more interfaces, such as baud rate, start/stop bits, data bits and data link protocol, and a controller 365 for switching the client device 120, 125 on and off, or resetting it, in response to control messages from the monitoring system 135. Preferably, the client device 120, 125 can also or alternatively deliver messages to an interface of a software system via a data capture device DC1, DC2. To this end, the input for receiving message data may instead provide an output for transmitting message data to an interface and the connection for forwarding received message data may instead provide a connection for receiving message data from the monitoring system 135 for delivery to the interface.

In order to support the provision of message data "in the other direction", that is from the monitoring system 135 into the system 100 being monitored, one or more client devices 120, 125 is adapted to receive system stimulation (or "simulation") messages from the monitoring system 135 and to output them to the monitored system 100 via at least one of its data capture devices DC1, DC2. This may require the provision of a stimulation message buffer at the client device 120, 125, for instance provided by the same storage capacity as that housing the interface parameter store 380, and modification of the controller 365 to include causing the client device 120, 125 to send onwards via the appropriate data capture device DC1, DC2 stimulation messages received from the monitoring system 135.

Importantly, the stimulation messages can optionally contain, or contain copies of, messages previously detected and logged. This means that monitored sequences of events can be effectively re-run for further analysis of a monitored system. It is possible to take message content detected in relation to a first subsystem interface and to deliver it back into the monitored system either in relation to the same interface or in relation to a different one. It is also possible to change aspects of the detected message content before delivering it back, for example by changing a time interval or a value reached by a variable.

3. Data Sets of the Monitoring System 135

Referring to FIG. 1, the monitoring system 135 is supported by the following significant data sets which are stored in the database 130:
- system descriptions 155 (also referred to herein as "network files 155")
- interface description ("ICD") files 160
- one or more log files 165
- triggers 170 for determining detection behaviour by the client devices 120, 125 or logging or analysis by the monitoring system 135
- bookmarks 175 for use in replaying logged data
- rules 180 for determining relationships between different subsystems 105, 110, 115
- stimulation scripts 197
- reports 195

3.1 System Descriptions (or "Network Files") 155

All three main data-based processes 305, 310, 315 of the monitoring system 135 (further described below) generally need to be run in the context of the monitored software system in order for the data to give useful information. For example, the user will need to know which subsystem interface has output a particular message and that requires information about the client device 120 and the data capture device DC1. If messages are to be decoded, it is necessary to know which interface the messages have come from in order to find a description of the possible message content. Also, in order to analyse events in the software system, the user may need to know at least some values for parameters of its interfaces. Information about the monitored software system is obtained by reference to a system description 155 identified by a user via the user interface 140. For each subsystem interface, the system description 155 will describe the type of interface (for example discrete, serial or analogue) and the parameters for that interface (for example for a serial interface that would include baud rate, start/stop bits, data bits and data link protocol), and would reference an ICD file 160 to describe the data on that subsystem interface, including a vocabulary element for interpreting for example enumerate data. The system description 155 will also specify each client device 120, 125 and will reference all subsystem interfaces to be monitored by that client device 120, 125, via its data capture devices DC1, DC2.

Referring to FIG. 1, a simple system description might define a single client device 120 monitoring a single data capture device DC1 which has two ports monitoring two interfaces. As shown in FIG. 1, the two interfaces would be those of subsystems "A" and "B". Typical references in the system description 155 to ICD files 160 for those two subsystem interfaces might then take the form "C:\SyDAT\s_param_icd.xml" and "C:\SyDAT\r_param_icd.xml" and it is the ICD files 160 which will then describe the data content of the interfaces.

An example system description 155 might thus contain the following elements:
- software version number
- address for relevant software schema
- a name for each client device 120 connected to the central monitoring system 135
- a port number for each client device port to which a data capture device DC1 is connected
- configuration data of each client device for each data capture device port which is monitoring an interface
- a reference to an ICD file 160 for each monitored interface The configuration data might comprise for example type and parameters of the relevant interface and synchronisation data for synchronising the host platforms of the client device 120, 125 and the monitoring system 135.

A system description 155 may completely describe the topology of the system to be monitored but it is possible to use more than one so that a system may be broken down into sections. In this case, the sum of the system descriptions 155 describes the complete system. System descriptions 155 reference out to ICD files 160 to describe the data content of each interface.

It would be possible for a client device 120 to have a dedicated data capture device DC1, in which case a system description 155 in relation to that client device 120 may not need a port number or configuration data. A system description 155 thus comprises, as its basic elements, data identifying at least one client device 120 and a reference to an ICD file 160 for each monitored interface. Preferably, however, the client device 120 may have more than one data capture device DC1, DC2 and may be configurable in relation to data capture devices DC1, DC2. In that case, a system description 155 in use may further identify one or ports of a client device 120 to respective ones of which one or more data capture devices DC1, DC2 are connected, and may also comprise configuration data for configuring the client device 120 to receive (or inject) data from (or to) a relevant interface.

In this way, the database 130 provides a system description store which, in use of the monitoring system, takes the form of the system descriptions 155.

3.2 ICD Files 160

A configuration tool 335 represented by the configuration process 335 is generally responsible for the ICD files 160. The ICD files 160 are stored, in use of the monitoring system, in the database 130 which thus provides an interface description store 160. The ICD files 160 are accessed via a data reader 336 of the configuration process 335. The three main data-based processes 305, 310, 315 all access the ICD files 160 via the configuration process 335. The configuration process 335 itself accesses the ICD files 160 to locate data for use in configuring each client device 120, 125 to receive data to be monitored. (The ICD data is stored in hash tables to give fast access for decoding.)

The ICD files 160 contain a full description of what is likely to appear in messages emanating from an interface. Data can then be decoded by use of a relevant ICD file 160 and selected data can be flagged as such and/or used to trigger various behaviours of the monitoring system 135.

The ICD files 160 describe the interface control data as a set of possible message types, each type being identified by a message ID. Each message type is broken down into fields, where a field represents one of a set of possible data types (eg float, integer, enumerate). Fields are defined to be formed from components to cater for big/little endian data, or embedded artefacts such as parity bits. Each field has a least significant bit ("LSB") value defined as a multiplier and expected minimum and maximum values. Data of the type "enumerate" will reference enumerate definitions so that the monitoring system 135 can display them instead of the numeric equivalent (eg. "0" and "1" may refer to "LEFT" and "RIGHT" and would be displayed as such).

It might be noted here that it may be preferable to define the message fields using a dynamically linked library ("DLL") which can then be expanded post delivery. These DLLs may also contain processing for encoding and decoding data in the fields.

An example ICD file 160 for an interface might thus contain the following elements:
  software version number
  address for relevant software schema
  definition of field structure for all messages relating to the relevant interface
  list of valid message types by name
  for each message name, transmission parameters such as
    length
    whether continuous
    sample rate
    message rate
  for each field relevant to each message name, data parameters such as
    enumeration type
    maximum value
    minimum value
    least significant bit ("LSB") value
    number of repeats
    component position, start bit, start byte and length in bits
  for each enumeration type, the alphanumeric text definition for display by the monitoring system An ICD file 160 thus comprises, as its basic elements, data defining at least one message structure and an alphanumeric text definition for display by the monitoring system in place of at least one data value carried by a detected message having that message structure. The data defining a message structure may comprise at least data defining a message field structure and preferably one or more parameter(s) of data, such as minimum and maximum values, that might appear in at least one field of a detected message. In a monitoring system 135 for monitoring heterogeneous systems having interfaces of different types which may each be monitored, the ICD file 160 will also contain transmission parameters in accordance with the interface to be monitored for each message type.

To build ICD files 160 manually, an appropriate software engineering tool allows a user, via a user interface 140, to select predefined field structures for messages from a list and to drop them on to a message graphically. The field structures represent the ways data could be defined within a message and include for example:
  a fixed length subset of bits at a fixed offset within the message
  a fixed length subset of bits at a location pointed to by the contents of another field
  a variable length field, the length being defined by another field
  an array structure, with a known number of fixed length elements In this way, a number of message definitions can be created and stored as ICD files 160.

3.3 Log Files 165

The structure of the log files 165 means that for all logged message data, the relevant client device 120, 125, subsystem interface and time of capture are recorded. The data itself is stored in its raw form in the database 130, as carried in messages on the monitored network links 185, 190. The database 130 thus provides a message content store in the form of the log files 165.

A message to be logged might be structured as follows:
Message ID, 8 bits, value 30 indicates that this is a temperature message type.
Source System ID, 8 bits
Temperature, 16 bits 0-1000 degrees in increments of 1 degree
Flags register—bit 0—sensor 1 failure, bit 1—sensor 2 failure, bit 2—system error
Padding 5 bits This gives a simple message that is 5 bytes long and may have the value, in hexadecimal, of:
1E 04 02 EA 01

Translated, this would be a temperature message indicating a reading of 746 degrees from subsystem 4, with a failure indicated from sensor 1.

Each log file is named, dated and stored against an "owner" ID, this usually being allocated to a specified user of the system 135. This allows a user to locate log files that might be created automatically as a result of a trigger or rule the user has set.

3.4 Triggers 170

These set conditions, usually but not necessarily threshold values, which can be set by the user to cause an action to be performed by the monitoring system 135 when it detects the triggering condition in a detected message. Once a trigger condition is set, the monitoring system 135 checks values of relevant fields within monitored data against the trigger condition. For example, a system 100 being monitored may have a message type defined for it which contains a field called "Temperature". A trigger 170 can be set for this field with a threshold value of 500, and a type of ">". This means that if this particular message is detected by monitoring the system 100, and the decoded value of the field is greater than 500, the trigger causes an action to be performed. Triggers can be of type ">", "<" or "=" and may be required to carry or reference additional data. Examples of actions that can be triggered are: start logging data; sound an alarm; insert a bookmark to logged data; or send an e-mail to a predefined address. Thus a trigger 170 may be required to identify data supporting these actions.

Triggers 170 can be implemented as a set of trigger definitions giving trigger type and identifying the relevant field of the messages to be monitored. The user then activates a trigger 170 (in an object-oriented software system, this could be described as "instantiating" a trigger) by populating additional fields with data, such as message type, the threshold value, an identifier for the action to be taken and a reference to any additional data required such as email address and content.

The triggers 170 are stored in the database 130 which provides a trigger store represented in use of the monitoring system by the triggers 170.

3.5 Bookmarks 175

Bookmarks are intended to help in replaying logged data 165 and represent placeholders in the logged data to identify points of interest. A bookmark can be inserted either during recording (that is, logging) or replay, either manually by the user or automatically as a result of a system process such as triggering 330. When a user later replays the logged data, it is possible to use a bookmark in conjunction with the replay controls for example to select passages of data that might warrant close scrutiny. For example, the user would select "go to next (or previous) bookmark".

The use of bookmarks in data is known and the bookmark itself can take known form. The point in the logged data 165 might be selected for example on the basis of time, or the appearance of a threshold value or an alarm.

3.6 Rules 180

Rules 180 are similar to triggers 170 but more complex. Where triggers 170 define one condition to be detected and followed by an action, rules 180 will define more than one related condition and this has the strength that the related conditions may occur in messages from different interfaces. The conditions set by a rule 180 may be based on the content and/or the timing of message data and will be defined by rule definitions 180 held within a file. A rule 180 may, for example, state that if a Message A appears containing Field Y, then message B is to be expected containing Field Z, where the value of Z is a function of Y as defined by the rule. Furthermore, Message B must be detected within a specified time frame after the detection of Message A.

Figure 5:
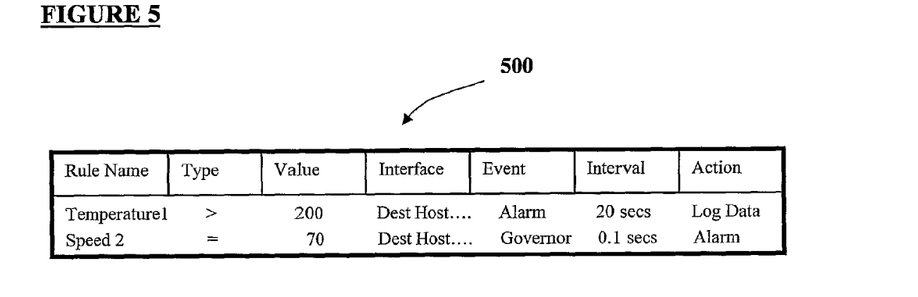
FIG. 5 shows a rules list that might appear on a screen view according to FIG. 4 for use by a user in operating a correlation process between behaviour of different subsystems of the monitored system.

Referring also to FIG. 5, the format of rule definitions 180 will include rule type and will identify the relevant field(s) and message type(s) to be monitored. The user activates a rule 180 by populating a rule definition in a rules listing 500 with data, such as values to be detected or a relationship between values, time frame data, an identifier for an action to be taken and a reference to any additional data required. Actions to be taken might be for example that the monitoring system 135 inserts a bookmark in logged data, issues an alarm and/or creates a report based on specified data emanating from a specified set of subsystem interfaces. FIG. 5 is further discussed below under the heading "5. USER INTERFACE: Triggers 430 and rules 500".

Thus rules 180 can be implemented in a way similar to triggers 170 but they go significantly beyond the functionality of triggers, providing correlation across interfaces and messages. Typically rules 180 will not cause the same sort of actions as triggers, but will usually aid the creation of a report describing the observed performance of a system under test/analysis.

3.7 Stimulation Scripts 197

These contain references to prepared sequences of messages in the ICD files 160, together with data values for use as data content for those messages. These stimulation scripts 197 define sequences of messages that will be output via the client devices 120, 125 and their data capture devices DC1, DC2 when injecting data to a monitored system 100.

3.8 Reports 195

An offline process 310 (further described below) uses raw logged data from the log files 165 which is decoded by reference to the ICD files 160 to produce reports 195 in the form of databases and/or text files which are then stored in the database 130. The reports 195 comprise a format which a user selects via the user interface 140 plus decoded logged data to produce human readable output. Again, the user selects the scope of the reports, in terms of what data will be selected and how it is to be presented, via the user interface 140

4. Processes of the Monitoring System

Referring to FIGS. 1 and 3, the principal processes of the monitoring system 135 are as follows:

- data logging 300
- data processing 305, 310, 315
- triggering 330
- configuration 335
- stimulation 340
- correlation 355
- data display 350

Between them, these processes create a very flexible and user-friendly monitoring arrangement that can be used with any subsystem(s) of a distributed system for which there is suitable interface data available.

A data processor for processing the message data prior to display on a user interface 140 beneficially includes the real-time 305, offline 310 and replay 315 processes and the data display 350 process. These are further described below.

All communications with the monitoring system 135 are handled via a communications function 325. Thus message data picked up from the network link 185, 190 by the data capture devices DC1, DC2 comes in to the communications function 325 via the relevant client device 120, 125 as client communications. The communications function 325 determines where the data will be dealt with in the monitoring system 135 and this will depend in turn on which data-based processes are running.

In the following text and in the figures, there are references to "SyDAT". This is a trade mark used to identify a monitoring system according to an embodiment of the invention. References to SyDAT should be understood as references to the overall monitoring system being described herein.

The communications process 325 can also be used to run slave devices for displaying monitored data in remote locations. A slave device would take the form of another instance of the SyDAT application 135 which takes as input the data collected by the master SyDAT application 135. This allows the data collected by one set of clients 120, 125 to be analysed by two or more geographically separated parties via the SyDAT user interface, and provides powerful opportunities for collaboration.

4.1 Data Logging 300

The monitoring system 135 monitors all messages in the monitored system 100 on all the interfaces for which it is configured. The content of selected messages can be viewed in real time by a user via the user interface 140, being selected for example by type and by the system interface from which they emanate. However, the messages can also be logged. Logging of message data is essential in particular to support the offline and replay processes 310, 315. Logging is done for all monitored message data when activated for example by a user input via the user interface 140 or by a trigger 170 or rule 180. Where a data logger, essentially the logging process 300, is running, the communications function 325 will send the raw message data, unprocessed, to a log file 165 in the database 130.

4.2 Data Processing 305, 310, 315

There are three main processes which operate on monitored message data: real-time 305, offline 310 and replay 315.

The real-time process 305 will be running either because a user has requested real-time display or because the triggering or correlation processes 330, 355 are running. If the real-time process 305 is running, the communications function 325 will send the raw message data to it.

Where a user has requested real-time display, they will have selected a display format. Several formats are available, including listing all monitored messages and their raw data content and/or displaying decoded data, in this case from only selected message types, fields of those message types, and emanating from selected subsystem interfaces. These parameters will have been specified by the user via a user interface 140. The real-time process 305 will respond by delivering the relevant data, coded or decoded, to a display process 350. If all monitored messages are to be listed, the real-time process 305 will deliver all raw message data to the display process 350. If selected, decoded data is to be displayed, the real-time process will filter raw data from the specified fields and message types, emanating from the specified interfaces, and call on a message data decoder 345 to decode the filtered message data by referring to a relevant ICD file 160 in the database 130. The filtered, decoded data is then sent to the data display process 350 for screen display at the user interface 140 in the user-selected display format. Typical display formats might be for example a table, graph or other graphical form, tracking values for one or more attributes in the data. The raw message data might also be shown in full.

If either the triggering process 330 or correlation process 355 is running, the real-time process 305 will deliver the raw message data to those processes 330, 355.

The offline process 310 and the replay process 315 both operate on logged data stored in log files 165 and will be run on user demand or, in the case of the offline process 310, by other processes such as triggering 330 or correlation 355. Log files 165 can be created by different users and processes and will cover different time periods. The user or other process will therefore generally need to specify one or more log files to the offline or replay processes 310, 315. Again, one or more message types, fields of those message types, and subsystem interfaces will have been specified by the user via the user interface 140, either at the time of running a report or replay or at the time of setting up a trigger 170 or rule 180.

The offline process 310 uses the raw logged data to produce reports 195 in the form of databases and/or text files which are then stored in the database 130. Usually, a user will have specified a report format requiring decoding of the message data and the offline process 310 will then call on the message decoding process of the message data decoder 345 to interpret logged data via the ICD files 160 to produce human readable output.

The replay process 315 is similar in that it will call on the message decoding process 345 to interpret the data via the ICD files 160 to produce human readable output. However, as well as a static display, in a replay process 315 the data can alternatively be displayed against time, effectively "replaying" the occurrence of the message data but now in human readable form. Every message entry in a log file 165 is stored against date and time and this data is necessarily provided to the display process 350 by the replay process 315.

4.3 Triggering 330

Where the triggering process 330 is running, the real-time process 305 sends all raw monitored data to the triggering process 330 which monitors it for specified conditions. For example, a value for an attribute in the data may reach a pre-specified threshold. If a condition is met, the monitoring system 135 might be triggered to take any of a number of actions. Examples of actions that can be performed are: start logging data; insert a bookmark to a log file 165; inject a stimulation message (further discussed below); sound an alarm; send an e-mail to a predefined address; or any combination thereof.

Although the triggering process 330 is "looking for" specified values in the data fields of a message which have been entered by a user, there is no necessity to decode the raw message data. The triggering process 330 can code a user-supplied value by reference to an appropriate ICD file 160 and search for the appropriate coded value.

4.4 Configuration 335

The functions that the configuration process 335 performs have been partially discussed above under the heading "3.2 ICD FILES 160". These include configuring the client devices C1, C2. The configuration process 335 can be run by an administrator using the user interface 140 and is used to set up all of the data sets of the monitoring system 135 described above under the heading "3. DATA SETS OF THE MONITORING SYSTEM 135". This functionality is of known type and not therefore described in great detail herein but it is an important feature particularly in embodiments of the invention which can be used with pre-existing or newly modified and heterogeneous software systems.

With regard to system descriptions 155, the administrator loads a set of ICD files 160 and can either enter system information manually or let the configuration process 335 build system information from ICD file content. The data reader 336 of the automated configuration process 335 reads the code of the ICD files 160 and a data writer 337 then stores the system and interface information in arrays suitable for rapid access during decoding, in use of the monitoring system. The format of the array for the system information constitutes a proforma or template which is then populated by the data writer 337 of the configuration process 335 to create or modify each system description 155.

As mentioned above, each system description 155 will describe, for each interface, the type of interface and the parameters for that interface and will reference an ICD file 160 to describe the data on that subsystem interface. The system description 155 will also specify each client device 120, 125 and its data capture devices DC1, DC2 and reference the subsystem interfaces to be monitored by that client device 120, 125. In order to create or modify a system description 155 from one or more ICD files 160, the configuration process 335 provides a tool which comprises a data reader for reading configuration data from interface descriptions and a configuration data writer for populating an array (constituting a proforma or template for a system description 155) with configuration data read from one or more interface descriptions. Additional data of a system description 155, such as describes the client devices 120, 125 and the data capture devices DC1, DC2, can be added for instance by user entry.

4.5 Stimulation 340

An important aspect of the monitoring system 135 is a stimulation process 340 (alternatively described as "simulation") which also draws on the ICD files 160. It may be the case in a heterogeneous distributed system that one or more subsystems 105, 110, 115 is not active, for instance because it is down, busy or actually absent. In this case, as long as the relevant ICD files 160 are present in the database 130, the stimulation process 340 has access to sufficient information to construct a virtual subsystem. It does this by injecting messages to the network link 185, 190 via the data capture devices DC1, DC2 which are now providing message outputs from the client devices 120, 125. Messages to be injected can be created by use of a message assembler 341 such as a scripting tool of known type and can represent outputs of the missing subsystem that might be, for instance, new data or responses to other subsystems.

An example of a suitable form of scripting tool might manifest itself as a list with one column per interface from the network file 155. The user may then drop messages from an ICD file 160 onto the list in the relevant column for the interface it is to be transmitted from. Each row of the list is assigned a time in milliseconds, which denotes the time that all messages on that row (across all interfaces) are to be transmitted. Each message in the list can be double clicked, which opens a form to allow the user to edit the contents of that message to insert real data. It is also possible to implement the insertion of a sequence of messages, allowing the user to specify that, say, one hundred messages of a selected type should be inserted from a selectable time, and they should be transmitted at a specified interval. The contents of the messages in the sequences can be specified as for example: 'field A' should contain the fixed value '5', 'field B' should contain data varying as a sine wave over the sequence time (max, min, and cycle rate specified), and so on.

Once the script has been created it can be run by pressing a play button and then paused, stopped or run at a selected speed. Running the script causes the data to be output via the client 120, 125 to the monitored system 100. Timing can be controlled by the stimulation process 340 or messages could be buffered in the client 120, 125 together with timing information so that the clients 120, 125 can control timing (more accurately).

The stimulation process 340 can be run either by a user or in response to the triggering process 330. For example, if a trigger were set up on a field "message ID" to activate when this has a value of 30 (that is, the message is a temperature message), one of a set of scripts would be run causing predefined data to be emitted via any one of the configured client devices 120, 125 and the appropriate data capture device DC1, DC2. For example, where a simple script is designed to output a single fixed message, this might be an ACKNOWLEDGE message that is emitted. If a user selects to run the stimulation process 340 via the user interface 140 instead of using a trigger, one or more messages might be chosen to represent unsolicited output by a subsystem. Further, more complex scripts might define a sequence of messages together with their content, ordering and timing.

The stimulation process 340 allows messages to be assembled by using the relevant ICD files 160 to code data rather than to decode it. Thus a user can choose predefined data for a set of scripts, or for a single message in real time, by selecting the data in human-readable form. The stimulation process 340 then codes the data appropriately by referring to one or more ICD files 160.

A powerful aspect of the stimulation process 340 is that message data that has been detected in monitoring a system 100 in use can be re-run by feeding it back into the same system. This provides great flexibility since a monitoring exercise can be repeated in a controlled manner in relation to one or more system interfaces with perhaps different triggers 170 or rules 180 being applied, or different interfaces being monitored. In this case, the stimulation process 340 may refer to the log files 165 instead of having to code the data since the log files contain raw data.

Alternatively, instead of re-running detected data, the triggering process 330 can be used to select the message data to be injected into a monitored system 100, based on detected data.

4.6 Correlation 355

In the above, it can be seen that the monitoring system 135 receives data from more than one data capture device DC1, DC2 and from more than one client device 120, 125. This opens up a powerful opportunity to track data from one interface to another by monitoring one or more specified data fields in the relevant messages. This can be implemented by installing a set of rules 180 in the database 130 which firstly set conditions and secondly set expected interface states. The rules 180 are similar to the triggers 170 described above. Triggers 170 set a condition to be met and then an action to be taken in response to the condition being met. The rules 180 also set an initial condition to be met but then set a secondary condition (the "expected interface state") potentially involving at least one other interface than the one for which the initial condition is met and only then set an appropriate action to be taken.

As with the triggering process 330, the correlation process 355 will process raw message data to detect an initial condition. It is not necessary to identify client devices 120, 125 or subsystem interfaces for which the initial condition should be met (although of course this would be an option). In order to set an initial condition, the rules 180 operate in the same manner as the triggering process 330. If this initial condition is met, the correlation process 355 will start to process subsequent raw message data to detect an expected interface state. To support this, a rule also therefore sets an expected interface state. An interface state will usually be a result of an event and might be for example the capture of a particular message on an interface within a set time. Whether or not the interface state occurs, the rule 180 will also determine the action to be taken. This might simply be logging of the fact that the interface state was detected or could be more complex. For example, additional monitoring might be triggered if the interface state is not detected.

In an example of the correlation process 355, a user might select a rule 180 of type "Temperature Alarm Response". Say the user is interested in temperatures occurring in a software-controlled transport system and in particular in the time interval between a rise in temperature in one subsystem and the receipt of an alarm message by another. The user populates an instance of their selected rule 180 by specifying a data value for the initial condition, such as 400° C. for a temperature field of messages, an event and a time window to define the expected interface state, and an action in the event of the interface state occurring or not occurring. When the correlation process 355 runs, the system 135 will look for the initial condition and the expected interface state and respond accordingly.

If a user requests a rule via the user interface 140, using the correlation process 355, any of the three main data-based processes 305, 310, 315 described above can be brought to operate the rule 180. This allows relationships between subsystems to be explored both conveniently and in considerable detail. For example, if a report is to be generated by the offline data processor 310, the user can leave the monitoring system 135 running and obtain the report at a later date. The offline data processor 310 will process the relevant log file 165, reading for example the coded data values from the temperature data field of logged messages. If a temperature value of 400° C. is found, the offline data processor starts to process message data from the time of detection of the 400° C. value in order to detect the specified interface state. Depending on the monitored system and specified report format, a report might then be generated showing the number of times the temperature value 400° C. was detected and the pattern of response of one or more system interfaces.

In practice, the correlation process 355 can be constructed as a special case of the trigger process 330. The trigger type selected will simply be one in which the action to be performed is to look for a specified interface state and then to act on correct/incorrect occurrences for example by producing a report 195.

In the above, the triggering and correlation processes 330, 355 are described as acting on all monitored or logged data. However, an alternative is that the user specifies subsystem interfaces in setting up a trigger 170 or rule 180 and the triggering and correlation processes 330, 355 incorporate the interface identities as part of the condition(s). Alternatively, the real-time, offline or replay processes 305, 310, 315 could filter the messages sent to the triggering and correlation processes 330, 355 on the basis of the relevant subsystem interface(s).

4.7 Data Display 350

The data display process 350 supports any of the above processes in outputting data in a format appropriate to the user interface 140. It is this process that enables the use of the bookmarks 175 and supports user controls such as fast forward and playback of content from log files 165. The data display process 350 primarily relies on known functionality and is not described in detail herein, although the overall functionality is further discussed under the heading "5. USER INTERFACE" below.

4.8 Manager 320

In addition to the processes mentioned above, there are a number of "manager" processes 320 which provide support roles to the monitoring system 135, such as maintaining system status, license conditions and version information. These are generally of known type and not further described herein.

5. User Interface

Figure 4:
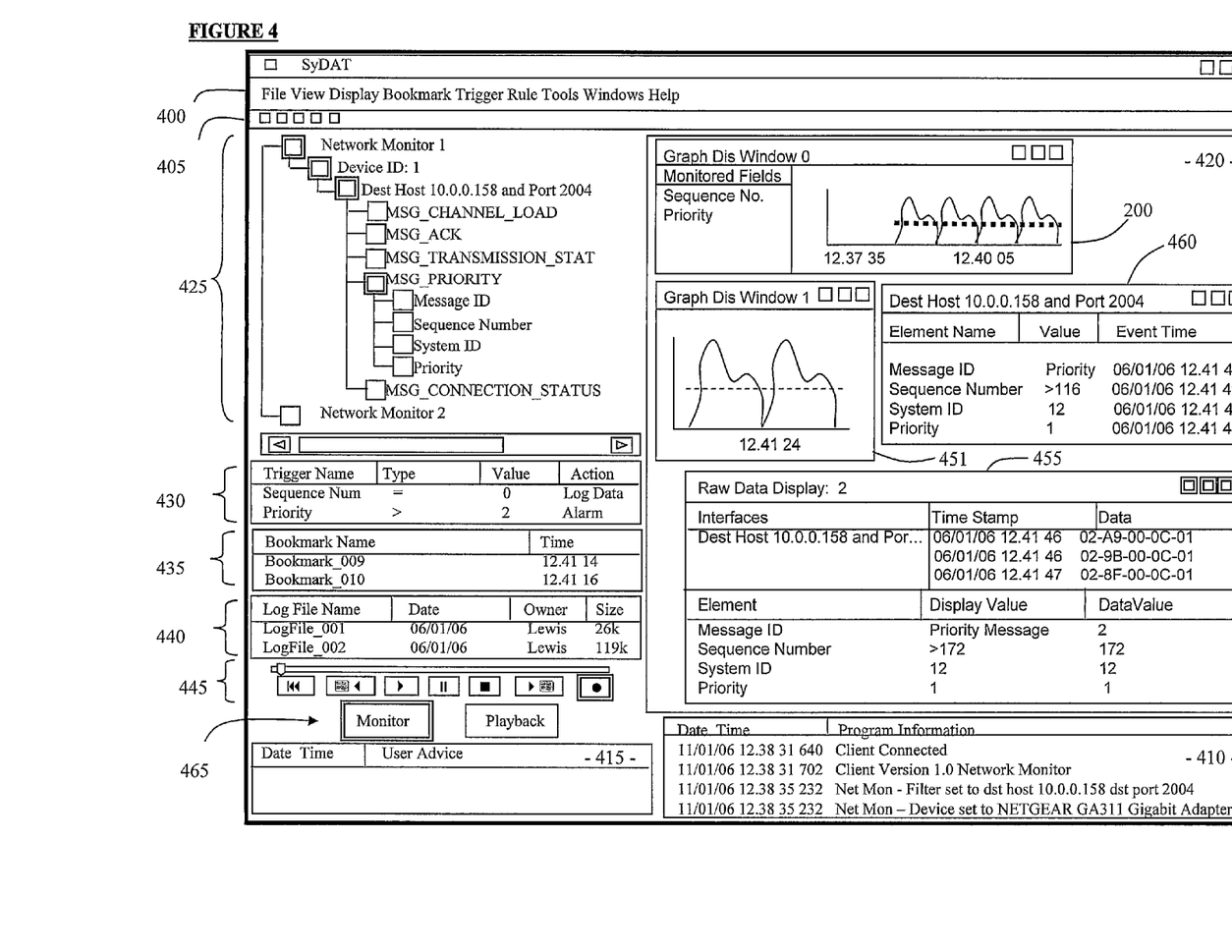
FIG. 4 shows a screen view of a graphical user interface for use by a user in running the monitoring system of FIG. 1.

Referring to FIG. 4, the user interface is a multiple document interface (MDI). It consists of a main window, which contains a menu bar 400 and a toolbar 405 at the top, a message area at the bottom which is divided into system messages 410 and user guidance 415, and a central portion divided into a display area 420 with a control area to the left of it.

The control area contains a network file/ICD display treeview 425, a list of triggers 430, a list of bookmarks 435, a list of log files 440, a recording and playback control area 445 including buttons and a slider, and a pair of mode buttons 465 for selecting whether the display is acting on real-time monitored data or on logged data for reports or replay. If the mode is to be "Monitor", the display will be supported by the real-time process 305. If the mode is to be "Playback", the display will be supported by the offline or replay processes 310, 315.

Once the user has selected between "Monitor" and "Playback" using the mode buttons 465, a typical sequence of user operation of the user interface would be:

Open One or More Network Files 155.

This is done from the file menu in the menu bar 400. Each network file 155 is then displayed as a root item in the treeview 425, and hierarchically under this is displayed each client device 120, 125 (only one shown: "Device ID: 1"), each interface monitored by each client device 120, 125 (only one shown: "Dest Host 10.0.0.158 and Port 2004"), each message type ("MSG_CHANNEL_LOAD", "MSG_ACK" etc), and then each field ("Message ID", "Sequence Number" etc) within each message type. The message types and field data are extracted from the ICD file 160 for that interface, which is referenced from the network file 155. All nodes of the treeview 425 can be expanded and collapsed to aid navigation.

Open a Display Window 200, 451, 460, 455

This is done by selecting an option from the "Display" menu in the menu bar 400, or by clicking on a button in the toolbar 405. There is a choice of display types which can be created, in each case by opening a window of the required type and then populating it for example by dragging and dropping items from the treeview 425. The following display types are shown in FIG. 4:

1. Raw data display 455—displays all data for an interface in hex byte format. To display data, the user opens a raw data display window 455, selects an interface from the treeview 425 and drags and drops it onto the raw data display window 455. Many interfaces can be dropped onto the window 455 (although only one is shown: "Dest Host 10.0.0.158 and Port 2004"), and data from each interface is colour coded. Clicking on a line of data in the raw data display decodes that message in the bottom part of the window in accordance with the appropriate ICD file 160.

2. Tabular display 460—displays particular messages that are received. The user opens a tabular display window 460, then drops a message type (such as "MSG_PRIORITY" as shown) from the treeview 425 on to it (only one: further drops overwrite the previously selected message type). Any messages received of this type from the message's parent interface in the treeview 425 are decoded, and the fields and values displayed in this window.

3. Graphical display 200, 451—displays decoded field data from a particular message type. The user may drop up to five fields from the treeview 425 onto a graph (potentially from different message types and/or from different interfaces), and as messages that contain these fields are received, the data is decoded and plotted on the graph. If, for example, the temperature field from a temperature message type is selected, a plot of temperature over time will be generated. If the temperature message type is as described above under the heading "3.3 Log Files 165", then this could be plotted for example in conjunction with a sensor failure field.

Record and Replay 445

The creation ("recording") and replay of log files 165 are controlled by a user by operating the log file control buttons and slider in the recording and playback control area 445 of the display.

Recording of a log file 165 will only be done in "Monitor" mode and is performed by the real-time process 305 when the user presses a record button in the recording and playback control area 445. When this is done an entry is created in the log file list 440, with a default name. This name can be overwritten by the user by editing the list. During recording, data being entered to the log file 165 by the real-time process 305 can be viewed via any form of display window 200, 451, 460, 455 the user has chosen to make active. Bookmarks may be inserted by pressing the bookmark button in the set of process buttons 465, the bookmark appearing in the bookmark list 435 with an overwriteable default name. A bookmark can be inserted in any log file being displayed at the user interface at the time of the user pressing the bookmark button. Pressing stop will stop recording.

Replay will of course only be done in "Playback" mode and is performed by selecting the required log file from the list 440 and pressing the play button. The user may select where replay happens by dragging the slider in the recording and playback control area 445 to a desired point in the log file 165, which can be viewed using any active display window 200, 451, 460, 455, or by navigating to the next or previous bookmarks. New bookmarks can also be added during replay. Graphical displays 200, 451 can be opened during replay, and signals dropped on from the replayed data as with real time.

Triggers 430 and Rules 500

Referring to FIGS. 4 and 5, triggers 170 are added by dragging and dropping fields from the treeview 425 onto the trigger list 430. This will give a default entry (eg. "Sequence Number=0, Log Data" as shown in FIG. 4). This can then be modified by the user to change the value, or the type (for example to <,=,>), or the action to email, log data, sound warning, insert bookmark, or initiate stimulation script. Once a trigger has been set up by a user in this way, a trigger data set 170 is stored in the system database 130 which contains all the information the real-time process 305 and triggering process 330 will require to operate the trigger.

Rules 180 can be added in the same manner. Although not shown in FIG. 4, a rules list 500 as shown in FIG. 5 can be present, or can be opened, on the user interface 140. Rules 180 are added, again by dragging and dropping fields from the treeview 425 and then modifying default values, this time onto the rules list 500. As shown, the rules list 500 will usually have more fields for the user to populate than a trigger list 430, and in particular might include for example:

Rule name, this identifying the nature of the rule to the system and therefore a field of interest in the messages. (In practice, if the rule name is determined by dragging and dropping a message type from the treeview 425, it would be a simple matter that the rule name carries with it an ID of a parent interface of particular interest to the user)

Type, this identifying the condition type such as whether it is a threshold value or a specific value to be looked for Value, this giving the actual value for the initial condition that will cause the rule to run Interface, this allowing the user to select a specific subsystem interface for which the expected interface state is to be detected Event, this identifying an event such as issue of an alarm message or a control message for redressing a situation in the monitored system 100

Interval, this setting a time window within which the event should be detected

Action, this determining the action to be taken by the correlation process if the second condition, the expected interface state, is either met or not met.

Normally, the action might be to prepare and store a report 195.

DISPLAY EXAMPLE

Referring to FIG. 4, as can be seen from the above, the nature of the treeview 425 is principally to facilitate selection of data to be made visible in the display area 420. As shown, the treeview 425 has been used to make the following selections:

Using the treeview 425, a network file 155 ("Network Monitor 1") has been selected which has just one client device 120 ("Device ID: 1") which in turn looks after just one interface, in this case "Dest Host 10.0.0.158 and Port 2004". The interface carries messages of five types and messages of type "MSG_PRIORITY" have been selected. The treeview 425 shows that messages of this type have four fields, or "elements", these being "Message ID", "Sequence Number", "System ID" and "Priority". Selection of these elements of the treeview 425 determines the data that will be selected for current display in the display area 420 of the user interface Using the mode buttons 465, it has been selected to run the system in "monitor" mode, meaning that live data is available to the user interface Using the recording and playback control buttons 445, the system has been set to record a new log file, meaning that raw live data coming in to the monitoring system 135 will be recorded as a log file for a user, recorded as the "owner" of the new log file by the system 135

The window which is currently active in the display area 420 is a raw data display window 455 which will list all messages of type "MSG_PRIORITY" detected for the interface "Dest Host 10.0.0.158 and Port 2004" which is currently selected via the treeview 425. Three other windows have been opened by the user but are not active, two of these being graphical display windows 200, 451 and one being a tabular display window 460. These three other windows are not therefore showing refreshed data.

An example of a message of the type "MSG_PRIORITY" is shown as the first one listed in the raw data display window 455: 02-A9-00-0C-01. The message carrying these fields could be decoded as follows:

Byte 0, 02, message id indicating that this is a priority message

Byte 1, A9, Sequence number—169

Bytes 2 and 3, 000C, System Id—12

Byte 4, 01, Priority—1

In the raw data display window 455, it is possible to select a message from the list that is decoded in the bottom part of the window. However, as shown, the message selected has scrolled off the top of the list and thus the sequence number does not match any of the rows shown. The message that has been decoded would have been: 02-AC-00-OC-01.

When a network file 155 has been selected from the treeview 425, data for that network file only will be loaded to the display process 350. However, there may be more than one network file 155 relevant to a monitored system. For example, network files 155 might be allocated to groups of subsystems within the monitored system 100. This can improve efficiency and allows the overall system 100 to be dealt with in sections. If there is more than one network file 155, the possibility arises that the monitor and replay modes require different network files 155 to be loaded. The mode buttons 465 therefore support toggling where a different network file 155 is to be loaded at the point of mode switching. The treeview 425 is refreshed with the live data network file 155 for live data viewing, or the network file 155 that was used for logging during replay. Although shown as a single screen with shared buttons between the two modes, it would be an alternative to use tabs as the mode changing mechanism and to separate the two screen views for the two modes. This allows the various buttons and selection and display mechanisms to be tuned to the appropriate mode.

The following describes examples of different screen views for the two modes:

In monitor mode, a normal monitoring treeview 425 is displayed, representing the loaded network files and interfaces (or relevant ICD files 160), together with "Record", "Stop" and "Bookmark" buttons.

In playback mode, a different treeview 425 is displayed, representing the network files 155 and ICD files 160 which were loaded when the data was recorded, together with "Play", "Stop", "Rewind" (to beginning of log file) and "Bookmark" buttons, and search buttons that will find bookmarks, trigger points or out of range values depending on the setting of a dropdown menu.

The functionality of the treeviews 425 for each mode is the same, that is dropping of messages fields etc onto graphs. As a new logfile 165 is selected in the logfile list 440, the playback treeview 425 will be reloaded so that it is appropriate to the logfile selected.

Referring to FIG. 2, a further example of a graphical display 200 that a user might select is shown in more detail. In this case, the display is related to messages of type "MSG_CONNECTION_STATUS". This type of message has five fields: Message ID; Sequence Number; Line Status; Number of Channels; and Signal Strength. Values of interest to the user are carried in all but the Message ID field and the other four fields have therefore been decoded and displayed against time on a shared axis. The lines representing the four fields can be colour coded. A thermometer style display 205 shows the instantaneous values of the four fields and measurements can be made using a calibrated rule 210 against any selected one of the fields.

Figure 6:
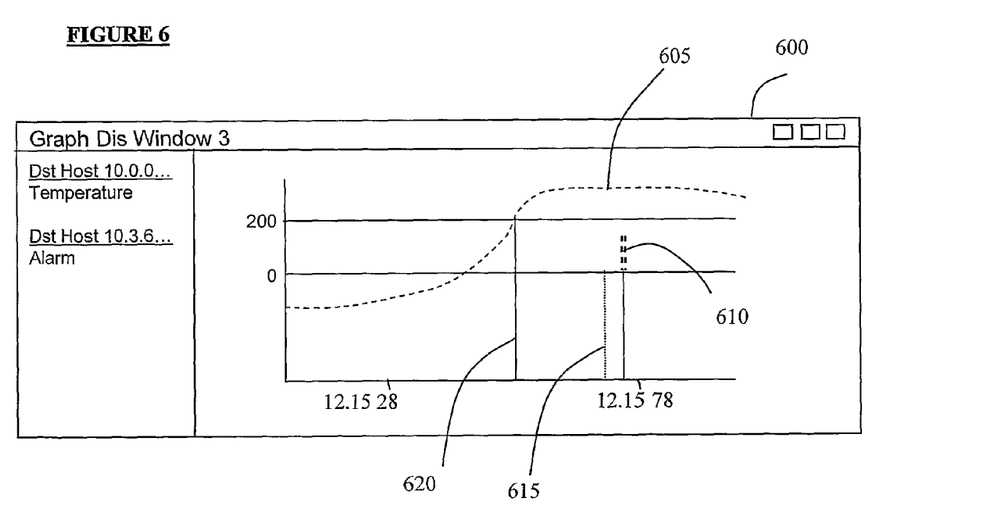
FIG. 6 shows examples of decoded data from different interfaces that has been decoded and correlated in a graphical report format.

Referring to FIGS. 5 and 6, a powerful aspect of embodiments of the invention is the ability to correlate events at different interfaces and FIG. 6 shows an example of a display which could appear on screen or provide the basis of a report, as a result of running the "Temperature1" rule shown in FIG. 5. In this case, two different interfaces, "Dst Host 10.0.0.158 Port 2004" and "Dst Host 10.3.6.235 Port 23", have been selected by the user in setting up the rule 180. The rule name "Temperature1" specifies the nature of the rule which in this case concerns a value for temperature, and the rule name has been entered by dragging and dropping the message type "MSG_TEMPERATURE" from the treeview 425 which has the parent interface "Dst Host 10.0.0.158 Port 2004". The initial condition type is ">", meaning that the rule operates when the temperature value goes above a threshold, and the value concerned is 200. The second interface "Dst Host 10.3.6.235 Port 23" has been entered directly to the rule proforma and the event to be detected is an alarm 610 within the interval 20 seconds. The action to be taken if the expected interface state is not detected is to log data, meaning that the messages on all interfaces will start to be logged so that subsequent analysis can be done.

FIG. 6 shows the on-screen view that might arise in real time as the rule described above is run. The threshold temperature 615 is shown and the time 620 at which the temperature value 605 being monitored rises above the threshold is marked. The interval 615 is shown and the detection of the expected interface state 610, in this case outside the interval. Consequently, the system 135 will start to log data, if data is not already being logged.

A second rule is listed in FIG. 5, this being a rule concerning speed called "Speed 2". The initial condition is "=", meaning that the rule operates when a speed value equals a threshold, the value concerned being 70. The event to be detected from the second interface is operation of a speed governor within 0.1 seconds. The action to be taken if this expected interface state is not detected is to raise an alarm. Thus in this scenario, the monitoring system can itself play a role in the operation being carried out by the system being monitored.

The user interface 140 as described above is being used in either a monitor or playback mode. It also supports the viewing of reports which might have been either selected by a user or triggered automatically. This facility can be accessed by a user via a menu such as the "View" menu. Either all reports can be listed and selected or a treeview 425 can be used to select one or more interfaces in order to get a list of reports stored with respect to those interfaces.

Referring to FIG. 1, in practice, there may be more than one instance of user interface 140a, 140b, and one of these may be remote from the other, connected across a communications network. It is possible to provide a live data feed to other instances of the monitoring system, or to other user interfaces of the same monitoring system. Thus raw data can potentially be provided to another instance of the monitoring system which can then log and process it as required by a user or administrator having access to this second, independent monitoring system, or a user at a second interface 140b may simply be given a remote view of the screen of a first user interface 140a.

The invention claimed is:

1. A monitoring system for monitoring message-sending system in use, the message-sending system comprising at least two subsystems having interfaces for sending and/or receiving messages comprising one or more data values and an interface state, each subsystem having at least one associated interface description, the monitoring system comprising:
   i) at least one message detector for detecting messages output by a said interface;
   ii) an interface description store for storing one or more of said interface descriptions; and
   iii) a message data decoder for decoding data from a message detected by the at least one message detector by reference to a stored interface description associated with said interface;
   the monitoring system, in use:
   iv) detecting a message output by a subsystem interface; and
   v) decoding data from the detected message by reference to said stored interface description for the subsystem interface,
   the monitoring system further comprising:
   vi) a trigger store for storing sets of trigger data, for use by the monitoring system in monitoring messages detected by the message detector, each set of trigger data identifying a condition to be applied to at least one data value in a said detected message and an action to be taken by the monitoring system in response to detection of a data value meeting the condition,
   wherein at least one stored set of trigger data comprises an interface state to be found in a said detected message and the action is taken in response to both detection of a data value meeting the condition and the presence or absence of the interface state.

2. A monitoring system according to claim 1, further comprising
   vii) a user interface for receiving user commands and for displaying message data decoded by the message data decoder,
   the monitoring system, in use, outputting decoded message data to the user interface.

3. A monitoring system according to claim 2, further comprising a data processor for processing message data prior to display on the or each user interface.

4. A monitoring system according to claim 3 wherein the data processor, in use, selects message data for display in accordance with at least one subsystem interface in relation to which the data was detected.

5. A monitoring system according to claim 4 wherein the data processor, in use, selects message data for display in accordance with at least two different subsystem interfaces in relation to which the data was detected.

6. A monitoring system according to claim 2, the system, in use, outputting decoded message data for transmission over a communications network to at least one further user interface.

7. A monitoring system according to claim 1, wherein at least one message detector further comprises a message output for outputting one or more messages to a subsystem interface.

8. A monitoring system according to claim 7, further comprising a message assembler for use in assembling messages for output by the at least one message detector to the subsystem interface.

9. A monitoring system according to claim 8 wherein the message assembler, in use, assembles at least one message comprising data determined at least in part by data from a detected message.

10. A monitoring system according to claim 9 wherein the message assembler, in use, assembles at least one message comprising the data from a detected message.

11. A monitoring system according to claim 8 wherein the assembler, in use, refers to a stored interface description to code a message, prior to the message being output to the subsystem interface.

12. A monitoring system according to claim 1, wherein the message detector comprises:
   i) at least one data capture device and at least one input for receiving message data from a said data capture device, the message data having been output by an interface of the message-sending system;
   ii) an interface parameter store for storing parameters of one or more interfaces for which message data will be received;
   iii) a connection for sending received message data for decoding by the message data decoder of the monitoring system and for receiving control messages of the monitoring system; and
   iv) a controller for controlling receipt of message data from the said data capture device in response to said control messages.

13. A monitoring system according to claim 12, wherein the message detector further comprises at least one output for transmitting one or more simulated messages of the monitoring system to a said data capture device for delivery to a message-sending system being monitored.

14. A monitoring system according to claim 13, wherein the simulated message output, in use, outputs one or more simulated messages based on, or comprising, detected message data.

15. A monitoring system according to claim 1, further comprising a system description store for storing at least one system description associated with the message-sending system, said at least one system description comprising a reference to at least one stored interface description for a subsystem interface of the message-sending system.

16. A monitoring system according to claim 15, wherein said at least one system description identifies at least one message detector connected, in use of the monitoring system, to the message-sending system so as to detect messages output by an interface described by a stored interface description referenced by that system description.

17. A monitoring system according to claim 15 wherein each system description stores parameters, in use of the monitoring system, describing each interface for which it comprises a reference to an interface description.

18. A monitoring system according to claim 1, comprising at least two message detectors connected, in use of the monitoring system, to the message-sending system so as to detect messages output by at least two interfaces of the message-sending system, each interface being described by a stored interface description.

19. A monitoring system according to claim 18, having a configuration tool comprising a data reader for reading configuration data from an interface description and a configuration data writer for populating a system description with configuration data read from one or more interface descriptions.

20. A monitoring system according to claim 1 wherein an interface state comprises a data value to be found in a detected message output from an interface and a time interval within which the data value is to be found.

21. A monitoring system according to claim 20 wherein the time interval of an interface state is set to start on detection of the condition identified by the same set of trigger data as comprises the interface state.

22. A monitoring system according to claim 1, wherein detected messages monitored for detection of the condition and for presence or absence of the interface state in respect of one set of trigger data, in use of the monitoring system, comprise messages output by different interfaces.

23. A monitoring system according to claim 22 adapted such that said detected messages may comprise messages output by interfaces of different subsystems.

24. A monitoring system according to claim 1, further comprising a message data logger for logging monitored message data against time.

25. A monitoring system according to claim 24, wherein an action identified by a set of trigger data comprises starting to log monitored message data.

26. A monitoring system according to claim 1, further comprising a message content store for storing content of messages detected by the at least one message detector.

27. A monitoring system according to claim 1 wherein each stored interface description for use in decoding messages comprises vocabulary to support said decoding.

28. A monitoring system according to claim 1 wherein messages sent and received by the message-sending system comprise data and each stored interface description describes the data carried in messages output, in use of the system, by an interface.

29. A monitoring system according to claim 1, wherein a condition identified by a set of trigger data comprises a data value for a specified field of a specified message type.

30. A monitoring system according to claim 1 wherein the condition and/or the action and/or the interface state is indicated by a trigger type associated with the set of trigger data.

31. A monitoring system according to claim 1 wherein the data value to which a condition is applied and/or the data value comprised by an interface state comprises a data value decoded by the message data decoder.

* * * * *